(12) United States Patent
Kim et al.

(10) Patent No.: US 9,129,186 B2
(45) Date of Patent: Sep. 8, 2015

(54) METHOD AND APPARATUS FOR PROCESSING ULTRASOUND IMAGE

(75) Inventors: Yun-tae Kim, Hwaseong-si (KR); Jung-ho Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 13/588,231

(22) Filed: Aug. 17, 2012

(65) Prior Publication Data

US 2013/0170721 A1 Jul. 4, 2013

(30) Foreign Application Priority Data

Dec. 29, 2011 (KR) ........................ 10-2011-0146100

(51) Int. Cl.
*G06K 9/00* (2006.01)
*G06K 9/40* (2006.01)
*G06T 5/00* (2006.01)
*G01S 15/89* (2006.01)

(52) U.S. Cl.
CPC . *G06K 9/40* (2013.01); *G06T 5/002* (2013.01); *G01S 15/8993* (2013.01); *G06T 2207/10136* (2013.01)

(58) Field of Classification Search
None
See application file for complete search history.

(56) References Cited

U.S. PATENT DOCUMENTS

| 5,497,777 | A | 3/1996 | Abdel-Malek et al. | |
|---|---|---|---|---|
| 6,511,426 | B1* | 1/2003 | Hossack et al. | 600/437 |
| 7,742,629 | B2* | 6/2010 | Zarkh et al. | 382/128 |
| 8,221,322 | B2* | 7/2012 | Wang et al. | 600/437 |
| 2007/0116342 | A1* | 5/2007 | Zarkh et al. | 382/130 |
| 2007/0232908 | A1* | 10/2007 | Wang et al. | 600/437 |
| 2008/0123992 | A1* | 5/2008 | Tian et al. | 382/276 |
| 2010/0228129 | A1 | 9/2010 | Osumi | |
| 2010/0239144 | A1* | 9/2010 | Fichtinger et al. | 382/131 |
| 2011/0007958 | A1* | 1/2011 | Salomon et al. | 382/131 |
| 2012/0224759 | A1* | 9/2012 | Masui et al. | 382/131 |
| 2013/0170721 | A1* | 7/2013 | Kim et al. | 382/131 |

FOREIGN PATENT DOCUMENTS

| JP | 2010-227554 A | 10/2010 |
|---|---|---|
| KR | 10-2006-0034003 A | 4/2006 |
| KR | 10-2009-0041475 A | 4/2009 |
| WO | WO 2011/052602 A1 * | 5/2011 |

* cited by examiner

*Primary Examiner* — Tahmina Ansari
(74) *Attorney, Agent, or Firm* — NSIP Law

(57) ABSTRACT

A method and apparatus for processing an ultrasound image are provided. The method includes determining similarities between a first two-dimensional (2D) ultrasound image, among 2D ultrasound images of a three-dimensional (3D) ultrasound image, and the 2D ultrasound images. The method further includes generating a predetermined number of similar ultrasound images with respect to the first 2D ultrasound image based on the similarities. The method further includes generating 3D volume data based on the predetermined number of the similar ultrasound images. The method further includes removing noise from the 3D volume data. The method further includes generating another 3D ultrasound image based on the noise-removed 3D volume data.

20 Claims, 7 Drawing Sheets

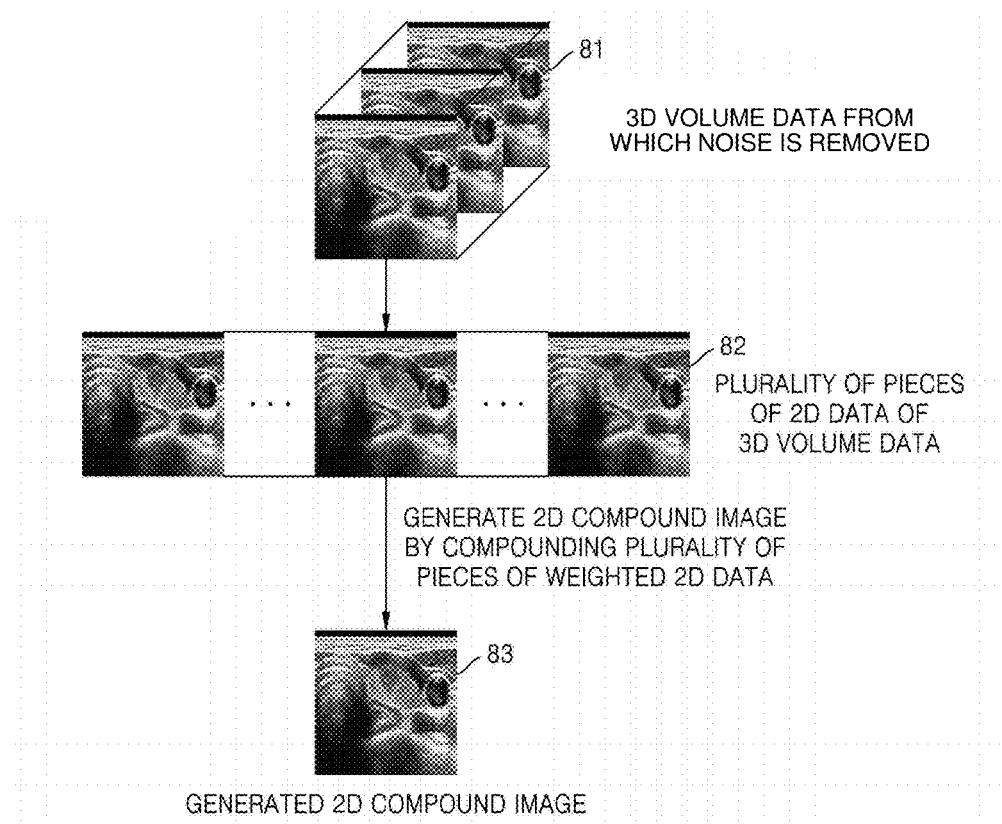

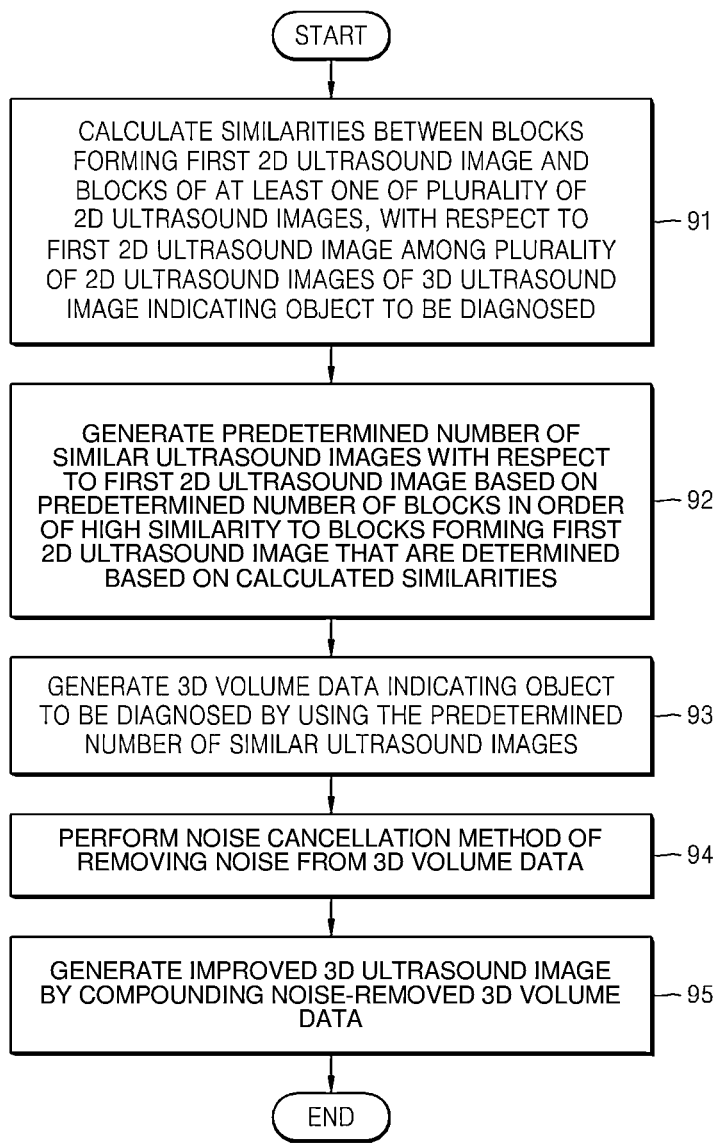

METHOD AND APPARATUS FOR PROCESSING ULTRASOUND IMAGE

CROSS-REFERENCE TO RELATED APPLICATIONS

This application claims the benefit of under 35 U.S.C. §119(a) Korean Patent Application No. 10-2011-0146100, filed on Dec. 29, 2011, in the Korean Intellectual Property Office, the disclosure of which is incorporated herein in its entirety by reference for all purposes.

BACKGROUND

1. Field

The following description relates to methods and apparatuses for processing an ultrasound image.

2. Description of the Related Art

Diagnostic devices using an ultrasound wave are widely being used. Ultrasound imaging diagnostic devices radiate an ultrasound wave to an object to be diagnosed, such as an internal organ, detect a reflection wave returning from the object to generate an image of the object, and provide the image. The ultrasound imaging diagnostic devices make real-time treatment possible, and are harmless to the human body. However, with respect to the ultrasound imaging diagnostic devices, a decrease in visibility due to noise, for example, speckle noise, may cause a decrease in image quality, compared with other medical diagnostic devices. The speckle noise occurs due to an interference phenomenon between ultrasound wavelengths viewed as spots in an image. Due to the decrease in the image quality, accuracy in perceiving a part, such as a boundary between the object and a background, also decreases.

SUMMARY

In one general aspect, there is provided an image processing method including determining similarities between a first two-dimensional (2D) ultrasound image, among 2D ultrasound images of a three-dimensional (3D) ultrasound image, and the 2D ultrasound images. The image processing method further includes generating a predetermined number of similar ultrasound images with respect to the first 2D ultrasound image based on the similarities. The image processing method further includes generating 3D volume data based on the predetermined number of the similar ultrasound images. The image processing method further includes removing noise from the 3D volume data. The image processing method further includes generating another 3D ultrasound image based on the noise-removed 3D volume data.

The 2D ultrasound images may be cross-sectional images orthogonal to a depth direction of the 3D ultrasound image.

The 2D ultrasound images may include a predetermined number of cross-sectional images most adjacent to the first 2D ultrasound image.

The 2D ultrasound images may include images immediately before and after the first 2D ultrasound image.

The image processing method may further include determining similarities between blocks of the first 2D ultrasound image and blocks of the 2D ultrasound images. The image processing method may further include determining a predetermined number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images. The image processing method may further include generating the predetermined number of the similar ultrasound images based on the predetermined number of the blocks.

The image processing method may further include determining similarities between blocks of the first 2D ultrasound image and blocks of the 2D ultrasound images based on differences between pixel values of the blocks of the first 2D ultrasound image and corresponding pixel values of the blocks of the 2D ultrasound images. The image processing method may further include determining a predetermined number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images. The image processing method may further include generating the predetermined number of similar ultrasound images based on the predetermined number of the blocks.

The image processing method may further include determining similarities between blocks of the first 2D ultrasound image and blocks of the 2D ultrasound images. The image processing method may further include generating motion vectors indicating directions and magnitudes from each of the blocks of the first 2D ultrasound image to a predetermined number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images. The image processing method may further include generating the predetermined number of similar ultrasound images based on the predetermined number of the blocks.

The image processing method may further include weighting pieces of 2D data of the 3D volume data. The image processing method may further include generating the other 3D ultrasound image based on the weighted pieces of the 2D data.

The image processing method may further include weighting blocks of pieces of 2D data based on a similarity to corresponding blocks of the first 2D ultrasound image. The image processing method may further include generating the other 3D ultrasound image based on the weighted blocks of the pieces of the 2D data.

The image processing method may further include applying a coefficient adjustment function to the noise-removed 3D volume data to adjust a coefficient of the noise-removed 3D volume data.

A computer-readable storage medium may store a program comprising instructions to cause a computer to implement the image processing method.

In another general aspect, there is provided an image processing apparatus including a similar ultrasound image generator configured to determine similarities between a first two-dimensional (2D) ultrasound image, among 2D ultrasound images of a three-dimensional (3D) ultrasound image, and the 2D ultrasound images, and generate a predetermined number of similar ultrasound images with respect to the first 2D ultrasound image based on the similarities. The image processing apparatus further includes a 3D volume data generator configured to generate 3D volume data based on the predetermined number of the similar ultrasound images. The image processing apparatus further includes a noise canceller configured to remove noise from the 3D volume data. The image processing apparatus further includes a 3D ultrasound image generator configured to generate another 3D ultrasound image based on the noise-removed 3D volume data.

The similar ultrasound image generator may be further configured to determine similarities between blocks of the first 2D ultrasound image and blocks of the 2D ultrasound images. The similar ultrasound image generator may be further configured to determine a predetermined number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images. The similar ultrasound image generator may be further configured to generate the predetermined number of the similar ultrasound images based on the predetermined number of the blocks.

The similar ultrasound image generator may be further configured to determine similarities between blocks of the first 2D ultrasound image and blocks of the 2D ultrasound images based on differences between pixel values of the blocks of the first 2D ultrasound image and corresponding pixel values of the blocks of the 2D ultrasound images. The similar ultrasound image generator may be further configured to determine a predetermined number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images. The similar ultrasound image generator may be further configured to generate the predetermined number of similar ultrasound images based on the predetermined number of the blocks.

The similar ultrasound image generator may be further configured to determine similarities between blocks of the first 2D ultrasound image and blocks of the 2D ultrasound images. The similar ultrasound image generator may be further configured to generate motion vectors indicating directions and magnitudes from each of the blocks of the first 2D ultrasound image to a predetermined number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images. The similar ultrasound image generator may be further configured to generate the predetermined number of similar ultrasound images based on the predetermined number of the blocks.

The 3D ultrasound image generator may be further configured to weight pieces of 2D data of the 3D volume data. The 3D ultrasound image generator may be further configured to generate the other 3D ultrasound image based on the weighted pieces of the 2D data.

The 3D ultrasound image generator may be further configured to weight blocks of pieces of 2D data based on a similarity to corresponding blocks of the first 2D ultrasound image. The 3D ultrasound image generator may be further configured to generate the other 3D ultrasound image based on the weighted blocks of the pieces of the 2D data.

Other features and aspects may be apparent from the following detailed description, the drawings, and the claims.

BRIEF DESCRIPTION OF THE DRAWINGS

FIG. 8 is a diagram illustrating an example of a method of compounding 3D volume data to generate a 2D compound image in a 3D ultrasound image generator.

FIG. 9 is a flowchart illustrating an example of an image processing method.

Figure 1:
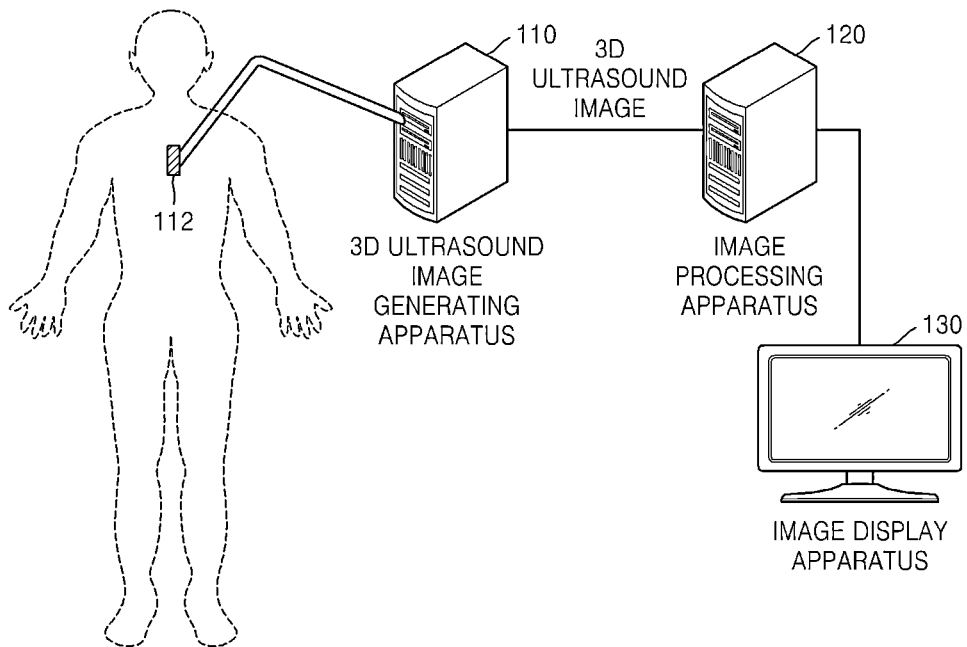
FIG. 1 is a schematic block diagram illustrating an example of an ultrasound diagnostic system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a schematic block diagram illustrating an example of an ultrasound diagnostic system. Only elements related to the example are shown in the ultrasound diagnostic system. Thus, one of ordinary skill in the art understands that other elements may be further included in the ultrasound diagnostic system. Referring to FIG. 1, the ultrasound diagnostic system includes a three-dimensional (3D) ultrasound image generating apparatus 110, an image processing apparatus 120, and an image display apparatus 130.

The 3D ultrasound image generating apparatus 110 includes an ultrasound probe 112. The ultrasound probe 112 radiates an ultrasound wave as a source signal to a predetermined part of the human body, i.e., an object to be diagnosed, and collects ultrasound waves reflected from the object. For example, the ultrasound probe 112 may include a piezoelectric transducer radiating an ultrasound wave in a range from about 2 MHz to about 18 MHz to the object. The ultrasound wave may be reflected from various tissues in the object and returned to the ultrasound probe 112. The ultrasound probe 112 may collect ultrasound waves, including the returned ultrasound wave, which may vibrate the piezoelectric transducer to generate a response signal of electric pulses. The ultrasound probe 112 transmits the response signal to the 3D ultrasound image generating apparatus 110.

The 3D ultrasound image generating apparatus 110 generates a 3D ultrasound image of the object based on the response signal received from the ultrasound probe 112. For example, to generate the 3D ultrasound image, the 3D ultrasound image generating apparatus 110 may detect 2D ultrasound images of the object while changing a position and a direction of the ultrasound probe 112 and accumulating the 2D ultrasound images. In another example, to generate the 3D ultrasound image, the 3D ultrasound image generating apparatus 110 may detect the 2D ultrasound images using a plurality of ultrasound probes 112 and accumulating the 2D ultrasound images. The 3D ultrasound image is transmitted to the image processing apparatus 120.

The image processing apparatus 120 generates a predetermined number of similar ultrasound images in an order of high similarity to a 2D ultrasound image of the 3D ultrasound image received from the 3D ultrasound image generating apparatus 110. The image processing apparatus performs image processing, such as noise cancellation and contrast improvement, on the received 3D ultrasound image based on the similar ultrasound images to generate an image quality-improved 3D ultrasound image. That is, to generate the image quality-improved 3D ultrasound image, the image processing apparatus 120 removes speckle noise from the received 3D ultrasound image without loss of the tissues while making tissue boundaries vivid. The image processing apparatus 120 transmits the image quality-improved 3D ultrasound image to the image display apparatus 130.

The image display apparatus 130 displays the received image quality-improved 3D ultrasound image received from the image processing apparatus 120. Accordingly, doctors and/or medical experts may observe the image quality-improved 3D ultrasound image.

Figure 2:
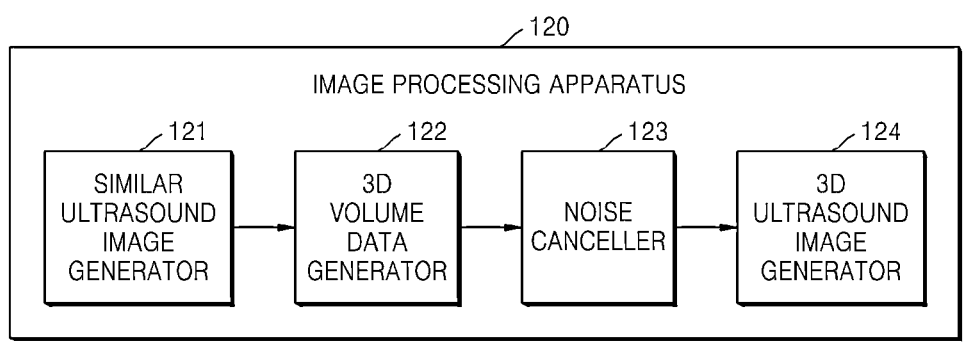
FIG. 2 is a block diagram illustrating an example of an image processing apparatus.

FIG. 2 is a block diagram illustrating an example of the image processing apparatus 120 of FIG. 1. The image processing apparatus 120 may correspond to a single processor or a plurality of processors. A processor may be implemented by an array of logic gates or a combination of a general-use microprocessor and a memory in which programs executable by the microprocessor are stored. In addition, one of ordinary skill in the art understand that the processor may be implemented by another form of hardware.

Referring to FIG. 2, the image processing apparatus 120 includes a similar ultrasound image generator 121, a 3D volume data generator 122, a noise canceller 123, and a 3D ultrasound image generator 124. Although the image processing apparatus 120 includes only the noise canceller 123 in FIG. 2, the image processing apparatus 120 may include a contrast improvement processor (not shown) in addition to the noise canceller 123.

The similar ultrasound image generator 121 determines similarities between blocks forming a first 2D ultrasound image, among 2D ultrasound images of a 3D ultrasound image including an object to be diagnosed, and blocks forming the 2D ultrasound images. Based on the similarities, the similar ultrasound image generator 121 determines a predetermined number of blocks, among blocks forming each of the 2D ultrasound images, in an order of high similarity to the each block forming the first 2D ultrasound image. Based on the predetermined number of the blocks, the similar ultrasound image generator 121 generates a predetermined number of similar ultrasound images, respectively, in an order of high similarity to the first 2D ultrasound image. Hereinafter, for convenience of description, although the first 2D ultrasound image, among the 2D ultrasound images of the 3D ultrasound image including the object to be diagnosed, is illustrated, the examples are not limited thereto, and may be applied to each of the 2D ultrasound images.

For example, the similar ultrasound image generator 121 may generate the predetermined number of the similar ultrasound images in the order of high similarity to the first 2D ultrasound image based on the first 2D ultrasound image and one or more 2D ultrasound images adjacent to the first 2D ultrasound image, among the total 2D ultrasound images. Since the adjacent 2D ultrasound images may include high correlations with the first 2D ultrasound image, the similar ultrasound image generator 121 may generate the predetermined number of the similar ultrasound images including high similarity to the first 2D ultrasound image.

In this example, the 2D ultrasound images adjacent to the first 2D ultrasound image may include one or more 2D ultrasound images most adjacent to the first 2D ultrasound image in a depth direction of the 3D ultrasound image. The depth direction of the 3D ultrasound image indicates a traveling direction of an ultrasound wave radiated to the object. That is, the first 2D ultrasound image and the adjacent 2D ultrasound images may be cross-sectional images orthogonal to the depth direction of the 3D ultrasound image.

In addition, when the similar ultrasound image generator 121 generates the predetermined number of the similar ultrasound images, the similar ultrasound image generator 121 may determine similarities between the blocks forming the first 2D ultrasound image and blocks forming the first 2D ultrasound image and the 2D ultrasound images adjacent to the first 2D ultrasound image. Based on the similarities, the similar ultrasound image generator 121 may generate a predetermined number of blocks, among blocks forming each of the first 2D ultrasound image and the adjacent 2D ultrasound images, in an order of high similarity to each block forming the first 2D ultrasound image, to generate the predetermined number of the similar ultrasound images.

To generate the predetermined number of the similar ultrasound images, the similar ultrasound image generator 121 may use a block matching method. The block matching method may include dividing the first 2D ultrasound image on a block unit basis, searching for a block, e.g., in an adjacent 2D ultrasound image, that is similar to each block of the first 2D ultrasound image, and showing a direction and a magnitude from each block to the similar block using a motion vector. The block matching method may further include replacing each block with the similar block indicated using the motion vector to generate a similar ultrasound image. The replacement of each block with the similar block is called motion compensation. A method of generating a predetermined number of similar ultrasound images using the block matching method will be described in more detail later with reference to FIG. 4.

In the block matching method, the similar ultrasound image generator 121 may divide an existing 2D ultrasound image on a block unit basis, search for a block similar to each block of the existing 2D ultrasound image, and replace each block with the similar block to generate a similar ultrasound image. Thus, the similar ultrasound image may be a 2D ultrasound image similar to the existing 2D ultrasound image. The similar ultrasound image generator 121 transmits the predetermined number of the similar ultrasound images to the 3D volume data generator 122.

The 3D volume data generator 122 generates 3D volume data based on the predetermined number of the similar ultrasound images received from the similar ultrasound image generator 121. In more detail, the 3D volume data generator 122 inputs the received predetermined number of the similar ultrasound images into a 3D memory (not shown) to generate the 3D volume data. The 3D volume data is transmitted to the noise canceller 123.

The noise canceller 123 performs a noise cancellation method of removing noise from the 3D volume data received from the 3D volume data generator 122. In more detail, the noise canceller 123 performs an anisotropic diffusion method of removing a speckle component and the noise from the received 3D volume data.

The anisotropic diffusion method includes applying an anisotropic diffusion filter to low-frequency image information of the received 3D volume data to increase an edge component and decrease the speckle component and the noise. The anisotropic diffusion filter is applied after a multiresolution transform is applied to the received 3D volume data to decompose the received 3D volume data into the low-frequency image information and high-frequency image information. The anisotropic diffusion method increases the edge component, and decreases the speckle component and the noise by applying the anisotropic diffusion filter to the low-frequency image information based on information on a magnitude of the edge component included in the low-frequency image information. The noise canceller 123 applies an inverse transform to the filtered low-frequency image information and the high-frequency image information to compound the filtered low-frequency image information and the high-frequency image information, thereby generating 3D volume data from which the noise is removed.

For example, the noise canceller 123 transforms the received 3D volume data to 3D image information including the low-frequency image information and the high-frequency image information based on a transform, such as a wavelet transform and a Laplacian pyramid transform. The noise canceller 123 applies an anisotropic diffusion filter to the transformed 3D image information to remove the speckle component and the noise. The noise canceller 123 transforms the filtered 3D image information to the 3D volume data from which the noise is removed based on an inverse transform. The noise canceller 123 may transmit the filtered 3D image information to the contrast improvement processor, and/or may transmit the noise-removed 3D volume data to the 3D ultrasound image generator 124. A method of removing noise from 3D volume data based on the multiresolution transform in the noise canceller 123 will be described in detail below with reference to FIG. 5.

The contrast improvement processor may apply a coefficient adjustment function to the filtered 3D image information to adjust a coefficient of the filtered 3D image information. Accordingly, the contrast improvement processor may improve a contrast of the 3D volume data. The contrast improvement processor may transform the noise-removed and coefficient-adjusted 3D image information to 3D volume data of which the contrast is improved based on an inverse transform. The contrast improvement processor may transmit the noise-removed and contrast-improved 3D volume data to the 3D ultrasound image generator 124. A method of improving a contrast of 3D volume data based on the coefficient adjustment function in the contrast improvement processor will be described in detail below with reference to FIG. 6.

The 3D ultrasound image generator 124 compounds the 3D volume data received from the noise canceler 123 and/or the contrast improvement processor to generate an improved 3D ultrasound image, i.e., an image quality-improved 3D ultrasound image in comparison to the original 3D ultrasound image. In more detail, the 3D ultrasound image generator 124 compounds pieces of 2D data of the received 3D volume data to generate a 2D compound image. The 3D ultrasound image generator 124 repeats the generation of the 2D compound image to generate a plurality of 2D compound images. The 3D ultrasound image generator 124 generates the improved 3D ultrasound image based on the 2D compound images. A number of pieces of the 3D volume data received by the 3D ultrasound image generator 124 is the same as a number of the 2D ultrasound images of the original 3D ultrasound image. That is, the 3D ultrasound image generator 124 compounds the pieces of the 3D volume data (i.e., the 2D ultrasound images) received from the 3D volume data generator 122, and generates the improved 3D ultrasound image based on the compounded pieces of the 3D volume data (i.e., the compounded 2D ultrasound images).

The 3D ultrasound image generator 124 may weight the pieces of the 2D data, and may compound the weighted pieces of the 2D data, to generate the improved 3D ultrasound image. The 3D ultrasound image generator 124 may weight the pieces of the 2D data on a block unit basis. The 3D ultrasound image generator 124 may further weight each block of the pieces of the 2D data based on a similarity of each block to a corresponding block of the first 2D ultrasonic image that is determined by the similar ultrasound image generator 121. The 3D ultrasound image generator 124 may sum coefficients corresponding to the weighted pieces of the 2D data to generate the 2D compound image.

Figure 3:
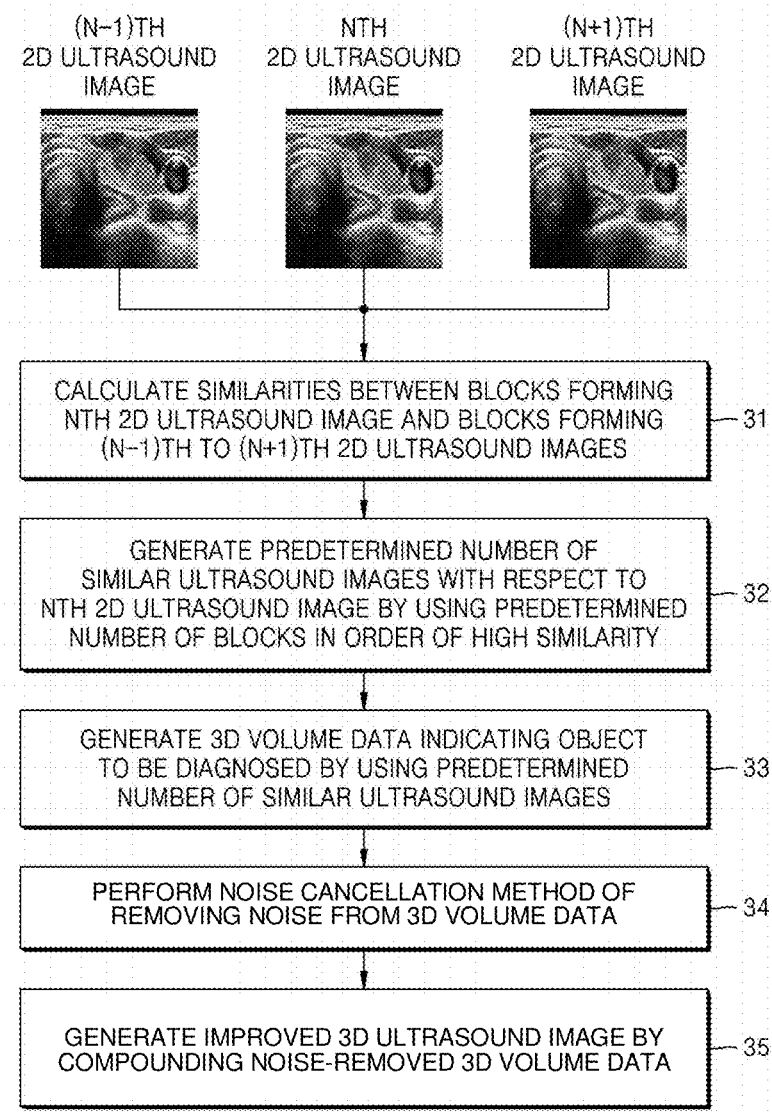
FIG. 3 is a flowchart illustrating an example of a method of removing noise from a 3D ultrasound image in an image processing apparatus.

FIG. 3 is a flowchart illustrating an example of a method of removing noise from a 3D ultrasound image in the image processing apparatus 120 of FIG. 2. Thus, although omitted hereinafter, the above description of the image processing apparatus 120 that has been made with respect to FIG. 2 also applies to the method of removing the noise from the 3D ultrasound image according to the example of FIG. 3.

Referring to FIG. 3, in operation 31, the similar ultrasound image generator 121 calculates similarities between blocks forming an Nth 2D ultrasound image and blocks forming (N−1)th to (N+1)th 2D ultrasound images. The (N−1)th to (N+1)th 2D ultrasound images are some of a plurality of 2D ultrasound images forming a 3D ultrasound image received by the similar ultrasound image generator 121 from the 3D ultrasound image generating apparatus 110 of FIG. 1. In addition, the (N−1)th to (N+1)th 2D ultrasound images are 3 continuous 2D ultrasound images in a traveling direction of an ultrasound wave radiated from the ultrasound probe 112 to an object to be diagnosed.

FIG. 3 illustrates an example where 3 continuous 2D ultrasound images are used to generate similar ultrasound images including high similarity to the Nth 2D ultrasound image. However, a number of 2D ultrasound images used by the similar ultrasound image generator 121 is not limited. Nevertheless, as the number of the 2D ultrasound images increases, similarities between the Nth 2D ultrasound image and the 2D ultrasound images decreases. Thus, to generate the similar ultrasound images including high similarity to the Nth 2D ultrasound image, the (N−1)th and (N+1)th 2D ultrasound images, immediately previous and subsequent (i.e., most adjacent) images of the Nth 2D ultrasound image, may be used.

In operation 32, the similar ultrasound image generator 121 generates a predetermined number of similar ultrasound images with respect to the Nth 2D ultrasound image by using a predetermined number of blocks, among blocks forming each of the (N−1)th to (N+1)th 2D ultrasound images, in an order of high similarity to each block forming the Nth 2D ultrasound image. The similar ultrasound image generator 121 generates the similar ultrasound images in an order of high similarity to the Nth 2D ultrasound image.

For example, assuming that the similar ultrasound image generator 121 generates 3 similar ultrasound images in an order of high similarity to the Nth 2D ultrasound image from the (N−1)th 2D ultrasound image, the similar ultrasound image generator 121 further generates 3 similar ultrasound images in an order of high similarity to the Nth 2D ultrasound image from each of the Nth and (N+1)th 2D ultrasound images. Thus, a total number of the similar ultrasound images generated by the similar ultrasound image generator 121 is 9.

In more detail, the similar ultrasound image generator 121 determines first to third similar blocks, among blocks of the (N−1)th 2D ultrasound image, in an order of high similarity to a first block of the Nth 2D ultrasound image. The similar ultrasound image generator 121 replaces the first block of the Nth 2D ultrasound image with the first to third similar blocks to generate first to third similar ultrasound images, respectively. By performing the block determination and replacing in the same manner for each block of the Nth 2D ultrasound image, the similar ultrasound image generator 121 generates the first to third similar ultrasound images formed by blocks including high similarity to blocks of the Nth 2D ultrasound image.

In operation 33, the 3D volume data generator 122 generates 3D volume data indicating the object to be diagnosed by using the predetermined number of similar ultrasound images generated by the similar ultrasound image generator 121. To generate the 3D volume data, the 3D volume data generator 122 sequentially inputs the predetermined number of similar ultrasound images into the 3D memory. For example, the 3D volume data generator 122 inputs similar ultrasound images generated using the blocks of the (N−1)th 2D ultrasound image, from among the predetermined number of similar ultrasound images, into the 3D memory as initial data, inputs similar ultrasound images generated using the blocks of the Nth 2D ultrasound image into the 3D memory, and inputs similar ultrasound images generated using the blocks of the (N+1)th 2D ultrasound image into the 3D memory. Since the 3D volume data includes high correlations between the similar ultrasound images forming the 3D volume data, the 3D volume data is effective in 3D filtering.

In operation 34, the noise canceller 123 performs a noise cancellation method of removing noise from the 3D volume data generated by the 3D volume data generator 122. For example, the noise cancellation method includes applying the anisotropic diffusion method to the 3D volume data. A method of performing the noise cancellation method will be described in detail below with reference to FIG. 5.

In operation 35, the 3D ultrasound image generator 124 generates an improved 3D ultrasound image by compounding the noise-removed 3D volume data. In more detail, the 3D ultrasound image generator 124 compounds pieces of 2D data of the noise-removed 3D volume data for a predetermined number of pieces of the nose-removed 3D volume data to generate 2D compound images. The 3D ultrasound image generator 124 generates the improved 3D ultrasound image based on a predetermined number of the 2D compound images. A method of generating an improved 3D ultrasound image in the 3D ultrasound image generator 124 will be described in detail below with reference to FIG. 8.

Performing the noise cancellation method on the 3D volume data generated based on similar ultrasound images is more effective in noise cancellation of the original 3D ultrasound image than directly performing the noise cancellation method on the original 3D ultrasound image.

Figure 4:
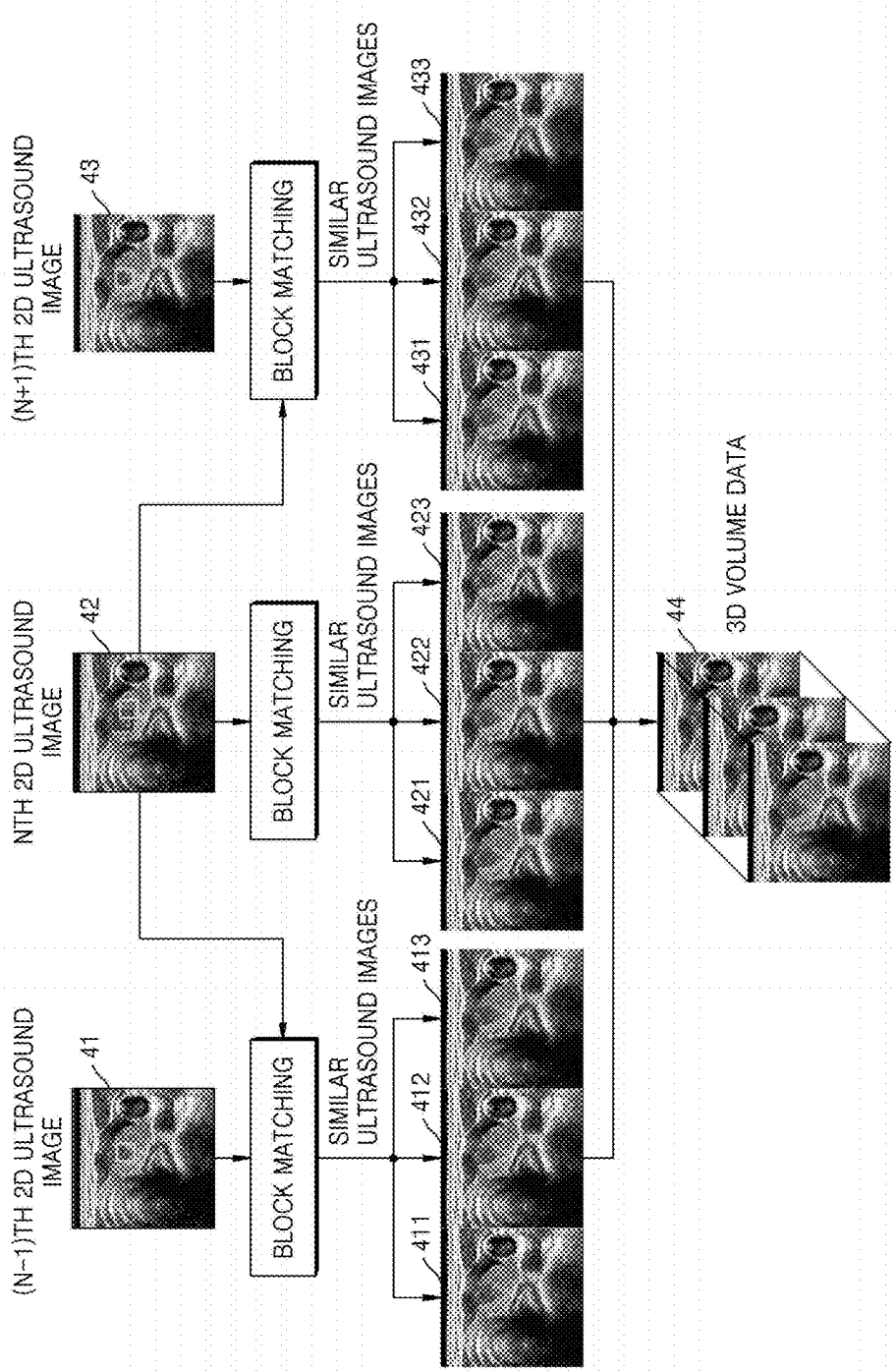
FIG. 4 is a diagram illustrating an example of a method of generating 3D volume data based on a 2D ultrasound image of a 3D ultrasound image in a similar ultrasound image generator and a 3D volume data generator.

FIG. 4 is a diagram illustrating an example of a method of generating 3D volume data based on a 2D ultrasound image of a 3D ultrasound image in the similar ultrasound image generator 121 and the 3D volume data generator 122 of FIG. 2. Thus, although omitted hereinafter, the above description of the similar ultrasound image generator 121 and the 3D volume data generator 122 that has been made with respect to FIG. 2 also applies to the method of generating the 3D volume data according to the example of FIG. 4.

Referring to FIG. 4, the similar ultrasound image generator 121 and the 3D volume data generator 122 generate 3D volume data 44 based on an Nth 2D ultrasound image 42 of a 3D ultrasound image indicating an object to be diagnosed. In more detail, the 3D ultrasound image further includes an (N−1)th 2D ultrasound image 41 and an (N+1)th 2D ultrasound image 43 that are adjacent to the Nth 2D ultrasound image 42. The similar ultrasound image generator 121 generates similar ultrasound images 411 to 413, 421 to 423, and 431 to 433 based on the (N−1)th to (N+1)th 2D ultrasound images 41 to 43, respectively, and the 3D volume data generator 122 generates the 3D volume data 44 based on the similar ultrasound images 411 to 413, 421 to 423, and 431 to 433.

In even more detail, the similar ultrasound image generator 121 receives the 3D ultrasound image from the 3D ultrasound image generating apparatus 110 of FIG. 1. The Nth 2D ultrasound image 42 is an arbitrary 2D ultrasound image among a plurality of 2D ultrasound images of the received 3D ultrasound image. The (N−1)th and (N+1)th 2D ultrasound images 41 and 43 are also 2D ultrasound images among the 2D ultrasound images of the received 3D ultrasound image. The (N−1)th to (N+1)th 2D ultrasound images 41 to 43 are 3 continuous 2D ultrasound images in a depth direction of the received 3D ultrasound image.

The similar ultrasound image generator 121 generates the similar ultrasound images 411 to 413, 421 to 423, and 431 to 433 in an order of high similarity to the Nth 2D ultrasound image 42 based on the (N−1)th to (N+1)th 2D ultrasound images 41 to 43. The similar ultrasound images 411 to 413, 421 to 423, and 431 to 433 are 2D images. For example, to generate the similar ultrasound images 411 to 413, the similar ultrasound image generator 121 determines similarities between blocks of the Nth 2D ultrasound image 42 and blocks of the (N−1)th 2D ultrasound image 41, and uses blocks of the (N−1)th 2D ultrasound image 41 that include high similarity to the blocks of the Nth 2D ultrasound image 42. In this example, the similar ultrasound image generator 121 determines similarities between a block of the Nth 2D ultrasound image 42 and all blocks of the (N−1)th 2D ultrasound image 41, and arranges 3 blocks of the (N−1)th 2D ultrasound image 41 that include highest similarities, among the determined similarities, at positions of the similar ultrasound images 411 to 413 that correspond to the block of the Nth 2D ultrasound image 42, respectively. The similar ultrasound image generator 121 repeats this process for each block of the Nth 2D ultrasound image 42 to generate the similar ultrasound images 411 to 413. The similar ultrasound images 421 to 423 and 431 to 433 are also generated through the same process as described above.

The similar ultrasound image generator 121 may generate the similar ultrasound images 411 to 413, 421 to 423, and 431 to 433 in an order of high similarity to the Nth 2D ultrasound image 42 based on the block matching method. In more detail, the similar ultrasound image generator 121 may divide the Nth 2D ultrasound image 42 on a block unit basis, may determine similarities between the each of the blocks of the Nth 2D ultrasound image 42 and, e.g., the blocks of the (N−1)th 2D ultrasound image 41, and may determine a similar ultrasound image formed by blocks of the (N−1)th 2D ultrasound image 41 that include high similarity based on the determined similarities. Similarities between the blocks may be determined based on differences between coefficients (e.g., pixel values) of the blocks, and the less the differences between the coefficients of the blocks, the higher the similarities between the blocks.

Equation 1 represents a similar ultrasound image generated based on the block matching method.

$$B_{2D}{}^m(x) = P_j{}^i(x + V(x)_j{}^i)$$

$$m = (j-1) \cdot s + i \qquad (1)$$

In Equation 1, $B_{2D}^m(x)$ denotes a motion-compensated similar ultrasound image, $P_j^i$ denotes an ith block of a jth 2D ultrasound image, $V(x)_j^i$ denotes a motion vector indicating the ith block of the jth 2D ultrasound image, and m (m=1, 2, ..., k·s) denotes an order of the motion-compensated similar ultrasound image.

The 3D volume data generator 122 generates the 3D volume data 44 based on the similar ultrasound images 411 to 413, 421 to 423, and 431 to 433. To generate the 3D volume data 44, the 3D volume data generator 122 stores the similar ultrasound images 411 to 413, 421 to 423, and 431 to 433 in the 3D memory. The 3D volume data 44 is generated based on the similar ultrasound images 411 to 413, 421 to 423, and 431 to 433 generated using blocks including high similarity to the blocks of the Nth 2D ultrasound image 42. Thus, correlations between the similar ultrasound images forming the 3D volume data 44 are high. Accordingly, the noise cancellation method of removing noise from the 3D volume data 44 is effective.

FIG. 4 shows that the similar ultrasound image generator 121 generates the 9 similar ultrasound images 411 to 413, 421 to 423, and 431 to 433 including high similarity to the Nth 2D ultrasound image 42 based on the (N−1)th to (N+1)th 2D ultrasound images 41 to 43. However, unlike FIG. 4, a number of similar ultrasound images generated by the similar ultrasound image generator 121 with respect to an Nth 2D ultrasound image is not limited thereto.

Equation 2 represents the 3D volume data 44 generated based on the similar ultrasound images in the 3D volume data generator 122.

$$B_{3D}=[B_{2D}^1, B_{2D}^2, \ldots, B_{2D}^{K \cdot S}] \quad (2)$$

In Equation 2, $B_{3D}$ denotes the 3D volume data 44, and $B_{2D}^1$ to $B_{2D}^{K \cdot S}$ denote similar ultrasound images generated based on the (N−1)th to (N+1)th 2D ultrasound images (cross-sectional images) 41 to 43, respectively.

Figure 5:
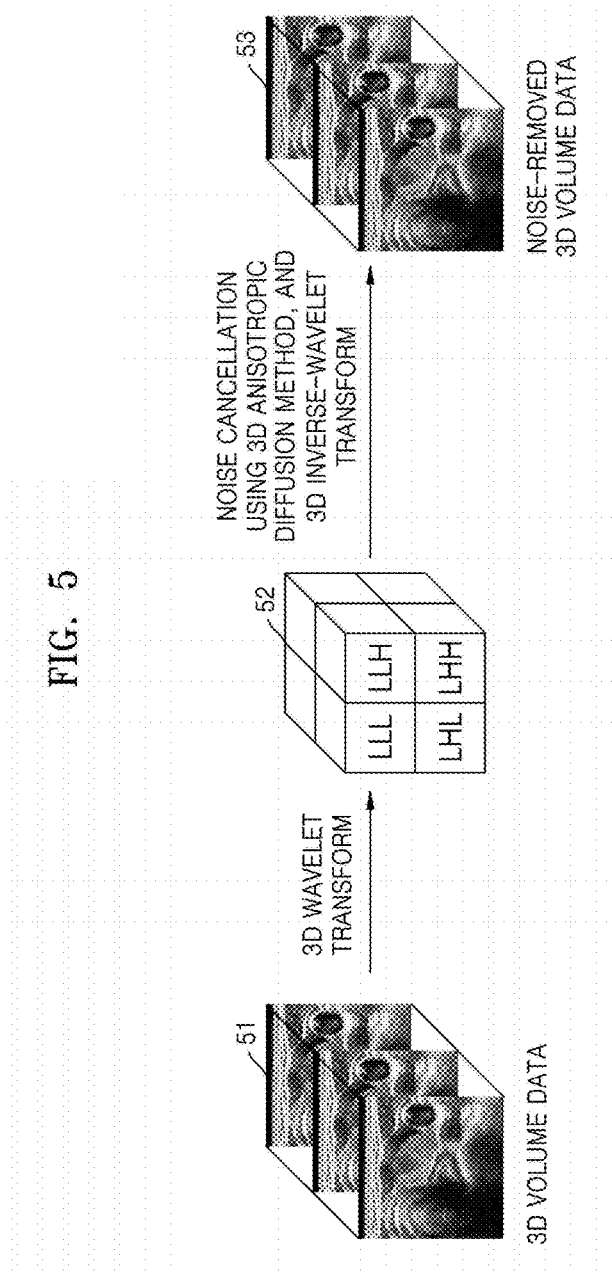
FIG. 5 is a diagram illustrating an example of a method of removing noise from 3D volume data in a noise canceller.

FIG. 5 is a diagram illustrating an example of a method of removing noise from 3D volume data in the noise canceller 123 of FIG. 2. Thus, although omitted hereinafter, the above description of the noise canceller 123 that has been made with respect to FIG. 2 also applies to the noise cancellation method according to the example of FIG. 5.

The noise canceller 123 transforms 3D volume data 51 generated by the 3D volume data generator 122 to 3D image information 52 including low-frequency and high-frequency image information. The noise canceller 123 may use a multiresolution decomposition method, such as, for example, a 3D wavelet transform and a Contourlet transform, in the transformation of the 3D volume data 51 to the 3D image information 52. FIG. 5 illustrates use of the 3D wavelet transform.

In more detail, the noise canceller 123 applies the multiresolution decomposition method to the 3D volume data 51 to decompose the 3D volume data 51 into the low-frequency and high-frequency image information. Although a highest level in the multiresolution decomposition method being a third level is illustrated in the example of FIG. 5, the example is not limited thereto. The multiresolution decomposition method may be performed in a range from a first level to an Nth level. The noise canceller 123 may decompose the 3D volume data 51 into one type of low-frequency image information (first image information) and seven types of high-frequency image information (second to eighth image information) based on the 3D wavelet transform. The decomposed image information may be as shown in the example of Table 1.

TABLE 1

|  | X axis | Y axis | Z axis |
|---|---|---|---|
| First image information | L | L | L |
| Second image information | H | L | L |
| Third image information | L | H | L |
| Fourth image information | H | H | L |
| Fifth image information | L | L | H |
| Sixth image information | H | L | H |
| Seventh image information | L | H | H |
| Eighth image information | H | H | H |

The first image information is the low-frequency image information, and the second to eighth image information are the high-frequency image information. L denotes a low-frequency component, and H denotes a high-frequency component.

The low-frequency image information (the first image information) includes low-frequency components of a spatial frequency component in the 3D volume data 51. The high-frequency image information (each of the second to eighth pieces of image information) includes at least one high-frequency component of the spatial frequency component in the 3D volume data 51 in at least one direction, respectively. For example, the low-frequency image information (the first image information) including only the low-frequency components in x-, y-, and z-axes directions is generated by applying a low-frequency filter in the x-, y-, and z-axes directions. As another example, the high-frequency image information (the second image information) including the high-frequency component in the x-axis direction is generated by applying a high-frequency filter in the x-axis direction and the low-frequency filter in the y- and z-axes directions.

The noise canceller 123 removes a speckle component and noise from the transformed 3D image information 52 to generate noise-removed 3D volume data 53. The noise canceller 123 uses a 3D anisotropic diffusion method in the removal. In more detail, the noise canceller 123 applies a anisotropic diffusion filter to the 3D image information 52. The anisotropic diffusion filter intensifies an edge component included in the low-frequency image information, and smoothes non-edge components included in the low-frequency image information. The edge component is diffused nonlinearly and anisotropically. On the contrary, the non-edge components represented by the speckle component and the noise are diffused linearly and isotropically. Thus, applying the anisotropic diffusion filter to the low-frequency image information increases a coefficient value of the edge component, and decreases coefficient values of the non-edge components.

The anisotropic diffusion filter is represented by a partial differential equation as expressed by the example of Equation 3.

$$\frac{\partial W_{3D}(x, y, z; t)}{\partial t} = div[C(x, y, z; t) \nabla W_{3D}(x, y, z; t)] \quad (3)$$

$$= \nabla C \cdot \nabla W_{3D}(x, y, z; t) + C(x, y, z) \nabla W_{3D}(x, y, z)$$

$$c(x, y, z; t) = \exp\left(-\left[\frac{\nabla W_{3D}(x, y, z)}{k}\right]^2\right) \text{ or}$$

$$c(x, y, z; t) = \frac{1}{1 + \left[\frac{\nabla W_{3D}(x, y, z)}{k}\right]^2}$$

In Equation 3, $W_{3D}(x, y, z; t)$ denotes the 3D image information 52 processed by the anisotropic diffusion filter, $\nabla$ denotes a gradient operator indicating the edge component of the 3D image information 52, div denotes a divergence operator, C(x, y, z; t) denotes a diffusion coefficient adjusting a diffusion rate, and k denotes a constant value adjusting sensitivity of the edge component.

The noise canceller 123 further transforms the filtered 3D image information 52 to the noise-removed 3D volume data 53 based on a 3D inverse-wavlet transform. In more detail, the 3D inverse-wavelet transform compounds the filtered low-frequency and high-frequency image information to generate the noise-removed 3D volume data 53.

Figure 6:
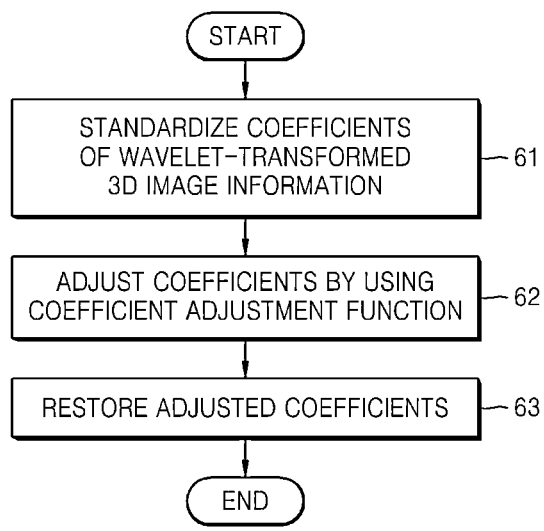
FIG. 6 is a flowchart illustrating an example of a method of improving a contrast of 3D volume data in a contrast improvement processor.

FIG. 6 is a flowchart illustrating an example of a method of improving a contrast of 3D volume data in a contrast improvement processor. Referring to FIG. 6, the contrast improvement processor adjusts coefficients of 3D image information wavelet-transformed from 3D volume data based on a coefficient adjustment function. The contrast improvement inverse-wavelet transforms the coefficient-adjusted 3D image information to generate or restore contrast-improved 3D volume data. The method of improving the contrast of the 3D volume data in the contrast improvement processor may be performed after the noise canceller 123 of FIG. 2 performs the noise cancellation method. Thus, the contrast improvement processor may omit multiresolution decomposition of the 3D volume data performed by the noise canceller 123, and may perform the contrast improving method after receiving multiresolution-decomposed 3D image information from the noise canceller 123.

In operation 61, the contrast improvement processor standardizes the coefficients of the wavelet-transformed 3D image information. That is, the contrast improvement processor searches for a maximum value and a minimum value of the coefficients in each frequency band of each level of the multiresolution-decomposed 3D image information, and standardizes the coefficients in each frequency band of each level based on the maximum value and the minimum value. The standardization includes dividing the coefficients in each frequency band of each level by the maximum value or the minimum value. Equation 4 represents an equation to standardize the coefficients in each frequency band of each level in the contrast improvement processor.

$$norW_{3D}^{l,m} = \begin{cases} \dfrac{W_{3D}^{l,m}}{max_l^m} & (if, W_{3D}^{l,m} \geq 0) \\ \dfrac{W_{3D}^{l,m}}{min_l^m} & (if, W_{3D}^{l,m} < 0) \end{cases} \quad (4)$$

In Equation 4, l denotes a level indicating a decomposing stage in a multiresolution decomposing method, m denotes a frequency band in each level, $norW_{3D}^{l,m}$ denotes a standardized coefficient of the 3D image information in a frequency band m of a level l, $W_{3D}^{l,m}$ denotes a coefficient of the 3D image information in the frequency band m of the level l, $max_l^m$ denotes a maximum value of the coefficients in the frequency band m of the level l, and $min_l^m$ denotes a minimum value of the coefficients in the frequency band m of the level l. That is, Equation 4 divides $W_{3D}^{l,m}$ by $max_l^m$ when $W_{3D}^{l,m}$ is greater than or equal to 0, and divides $W_{3D}^{l,m}$ by $min_l^m$ when $W_{3D}^{l,m}$ is less than 0.

In operation 62, the contrast improvement processor adjusts the standardized coefficients by using a coefficient adjustment function.

Figure 7:
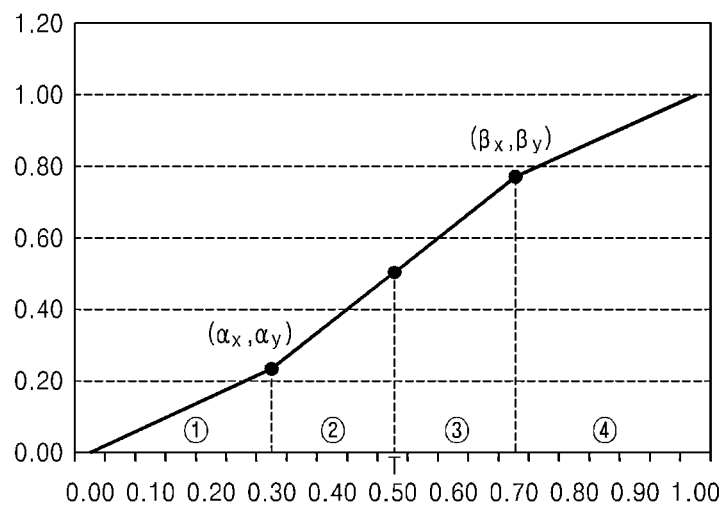
FIG. 7 is a graph illustrating an example of a coefficient adjustment function applied to coefficients of 3D image information in a contrast improvement processor.

FIG. 7 is a graph illustrating an example of a coefficient adjustment function applied to coefficients of 3D image information in a contrast improvement processor. Referring to FIG. 7, $\alpha_x$, $\beta_x$, and T denote threshold values in applying the coefficiency adjustment function to a standardized coefficient, which is an input value of the coefficient adjustment function, on a division basis. That is, values of coefficients standardized by Equation 4 and input into the coefficient adjustment function are represented on an x-axis. If a value of an input coefficient is less than $\alpha_x$, the coefficient adjustment function corresponding to a division ① is applied to the input coefficient to determine an output coefficient with respect to the input coefficient. If the value of the input coefficient is greater than or equal to $\alpha_x$ and less than T, the coefficient adjustment function corresponding to a division ② is applied to the input coefficient to determine the output coefficient with respect to the input coefficient. If the value of the input coefficient is greater than or equal to T and less than $\beta_x$, the coefficient adjustment function corresponding to a division ③ is applied to the input coefficient to determine the output coefficient with respect to the input coefficient. If the value of the input coefficient is greater than or equal to $\beta_x$, the coefficient adjustment function corresponding to a division ④ is applied to the input coefficient to determine the output coefficient with respect to the input coefficient.

The coefficient adjustment function shown in FIG. 7 is represented by the examples of Equations 5 to 8.

$$\text{if, } |norW_{3D}^{l,m}| \leq \alpha_x \quad (5)$$
$$reW_{3D}^{l,m} = \log_2(\gamma \cdot norW_{3D}^{l,m} + 1)$$
$$\gamma = \frac{2^{\alpha_x} - 1}{\alpha_x}$$

$$\text{if, } \alpha_x < |norW_{3D}^{l,m}| \leq T \quad (6)$$
$$reW_{3D}^{l,m} = |norW_{3D}^{l,m}|^P \cdot T^{(l-p)} \cdot \text{sign}(norW_{3D}^{l,m})$$

$$\text{if, } T < |norW_{3D}^{l,m}| \leq \beta_x \quad (7)$$
$$reW_{3D}^{l,m} = \left(1 - \left(1 - |norW_{3D}^{l,m}|\right)^P\right) \cdot (1 - T)^{(1-P)} \cdot \text{sign}(norW_{3D}^{l,m})$$

$$\text{if, } |norW_{3D}^{l,m}| > \beta_x \quad (8)$$
$$\delta = \frac{2^{\beta_x} - 1}{\beta_x}, b = 1 - \log_2(\delta + 1)$$

Referring back to FIG. 6, in operation 63, the contrast improvement processor restores the coefficients adjusted by the coefficient adjustment function. That is, the contrast improvement processor restores the adjusted coefficients to original coefficient magnitudes before the standardization by multiplying the adjusted coefficients by $max_l^m$ or $min_l^m$. In this example, since each coefficient has been adjusted by the coefficient adjustment function, even though the adjusted coefficient is multiplied by $max_l^m$ or $min_l^m$, the multiplication result includes a different value than the original coefficient before the standardization.

Equation 9 represents an equation restoring coefficients to original coefficient magnitudes before standardization in the contrast improvement processor.

$$\tilde{W}_{3D}^{l,m} = \begin{cases} reW_{3D}^{l,m} \times max_l^m & (if, reW_{3D}^{l,m} \geq 0) \\ reW_{3D}^{l,m} \times min_l^m & (if, reW_{3D}^{l,m} < 0) \end{cases} \quad (9)$$

In Equation 9, $\tilde{W}_{3D}^{l,m}$ denotes a coefficient of the 3D image information in the frequency band m of the level l, which is restored to an original coefficient magnitude before standardization.

FIG. 8 is a diagram illustrating an example of a method of compounding 3D volume data to generate a 2D compound image in the 3D ultrasound image generator of FIG. 2. Thus, although omitted hereinafter, the above description of the 3D ultrasound image generator 124 that has been made with respect to FIG. 2 also applies to the method of generating the 2D compound image according to the example of FIG. 8.

Referring to FIG. 8, the 3D ultrasound image generator 124 compounds a plurality of pieces of 2D data 82 of 3D volume data 81 from which the noise is removed to generate a 2D compound image 83. The 3D volume data 81 input into the 3D ultrasound image generator 124 is 3D volume data for which the noise cancellation method has been performed in the noise canceller 123, and includes the pieces of 2D data 82. A number of the pieces of the 2D data 82 is the same as a number of similar ultrasound images generated by the similar ultrasound image generator 121. For example, assuming as the example of FIG. 4 that the similar ultrasound image generator 121 generates 9 similar ultrasound images, the number of the pieces of the 2D data 82 is also 9.

The 3D ultrasound image generator 124 may weight the pieces of the 2D data 82. The 3D ultrasound image generator 124 may compound the weighted pieces of the 2D data 82 to generate the 2D compound image 83.

Equation 10 represents an equation generating the 2D compound image 83 in the 3D ultrasound image generator 124.

$$\tilde{P}(x) = \frac{\sum_{m=1}^{k \cdot s} w_m \cdot \tilde{B}_{2D}^m(x)}{\sum_{m=1}^{k \cdot s} w_m} \quad (10)$$

In Equation 10, $\tilde{P}(x)$ denotes a 2D compound image generated by compounding the weighted pieces of the 2D data 82, $\tilde{B}_{2D}^m(x)$ denotes a single piece of the 2D data 82 of the 3D volume data 81, and $W_m$ denotes a weight applied to $\tilde{B}_{2D}^m(x)$.

Equation 10 is only an example of weighting the pieces of the 2D data 82, and various other methods may be used to weight the pieces of the 2D data 82. When the 3D ultrasound image generator 124 weights the pieces of the 2D data 82, the 3D ultrasound image generator 124 may weight them based on similarities to an arbitrary 2D ultrasound image that are determined by the similar ultrasound image generator 121, and on a block basis.

FIG. 9 is a flowchart illustrating an example of an image processing method. Referring to FIG. 9, the image processing method includes operations sequentially processed by the image processing apparatus 120 of FIG. 2. Thus, although omitted hereinafter, the above description of the image processing apparatus 120 that has been made with respect to FIG. 2 also applies to the image processing method according to the example of FIG. 9.

In operation 91, the similar ultrasound image generator 121 calculates similarities between blocks forming a first 2D ultrasound image and blocks of at least one of a plurality of 2D ultrasound images, with respect to the first 2D ultrasound image among the plurality of 2D ultrasound images of a 3D ultrasound image indicating an object to be diagnosed. In operation 92, the similar ultrasound image generator 121 generates a predetermined number of similar ultrasound images with respect to the first 2D ultrasound image based on a predetermined number of blocks in an order of high similarity to the blocks forming the first 2D ultrasound image that are determined based on the calculated similarities.

In operation 93, the 3D volume data generator 122 generates 3D volume data indicating the object to be diagnosed by using the predetermined number of similar ultrasound images. In operation 94, the noise canceller 123 performs a noise cancellation method of removing noise from the 3D volume data. In operation 95, the 3D ultrasound image generator 124 generates an improved 3D ultrasound image by compounding the noise-removed 3D volume data.

According to the teachings above, there is provided a method of generating a predetermined number of similar ultrasound images in an order of high similarity to a 2D ultrasound image of a 3D ultrasound image indicating an object to be diagnosed, and removing noise of the 3D ultrasound image based on the predetermined number of similar ultrasound images. Accordingly, an image-quality-improved 3D ultrasound image may be generated and provided to medical experts. Directly applying a noise cancellation method to a 3D ultrasound image is not effective in removing the noise of the 3D ultrasound image. However, in the examples described above, since the noise cancellation method is applied to 3D volume data generated based on the similar ultrasound images in an order of high similarity to the 2D ultrasound image, the noise of the 3D volume data may be effectively removed.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are configured to store and perform program instructions, such as read-only memory (ROM), random access memory (RAM), flash memory, and the like. Examples of program instructions include machine code, such as produced by a compiler, and files including higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. An image processing method comprising:
determining similarities between a first two-dimensional (2D) ultrasound image and 2D ultrasound images of a three-dimensional (3D) ultrasound image;

generating a number of similar 2D ultrasound images with respect to the first 2D ultrasound image based on the similarities;
generating 3D volume data based on the number of the similar 2D ultrasound images;
removing noise from the 3D volume data;
generating 2D compound image by compounding the noise-removed 3D volume data; and
generating another 3D ultrasound image based on the 2D compound image with respect to the each of the 2D ultrasound images of the 3D ultrasound image.

2. The image processing method of claim 1, wherein the 2D ultrasound images are cross-sectional images orthogonal to a depth direction of the 3D ultrasound image.

3. The image processing method of claim 1, wherein the 2D ultrasound images comprise a number of cross-sectional images most adjacent to the first 2D ultrasound image.

4. The image processing method of claim 1, wherein the 2D ultrasound images comprise images immediately before and after the first 2D ultrasound image.

5. The image processing method of claim 1, further comprising:
determining similarities between blocks of the first 2D ultrasound image and blocks of the 2D ultrasound images;
determining a number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images; and
generating the number of the similar ultrasound images based on the number of the blocks.

6. The image processing method of claim 1, further comprising:
determining similarities between blocks of the first 2D ultrasound image and blocks of the 2D ultrasound images based on differences between pixel values of the blocks of the first 2D ultrasound image and corresponding pixel values of the blocks of the 2D ultrasound images;
determining a number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images; and
generating the number of similar ultrasound images based on the number of the blocks.

7. The image processing method of claim 1, further comprising:
determining similarities between blocks of the first 2D ultrasound image and blocks of the 2D ultrasound images;
generating motion vectors indicating directions and magnitudes from each of the blocks of the first 2D ultrasound image to a number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images; and
generating the number of similar ultrasound images based on the number of the blocks.

8. The image processing method of claim 1, further comprising:
weighting pieces of 2D data of the 3D volume data; and
generating the other 3D ultrasound image based on the weighted pieces of the 2D data.

9. The image processing method of claim 1, further comprising
weighting blocks of pieces of 2D data based on a similarity to corresponding blocks of the first 2D ultrasound image; and
generating the other 3D ultrasound image based on the weighted blocks of the pieces of the 2D data.

10. The image processing method of claim 1, further comprising:
applying a coefficient adjustment function to the noise-removed 3D volume data to adjust a coefficient of the noise-removed 3D volume data.

11. A non-transitory computer-readable storage medium storing a program comprising instructions to cause a computer to implement the image processing method of claim 1.

12. An image processing apparatus comprising: a similar ultrasound image generator configured to determine similarities between a first two-dimensional (2D) ultrasound image and 2D ultrasound images of a three-dimensional (3D) ultrasound image, and to generate a number of similar 2D ultrasound images with respect to the first 2D ultrasound image based on the similarities; a 3D volume data generator configured to generate 3D volume data based on the number of the similar 2D ultrasound images; a noise canceller configured to remove noise from the 3D volume data; and a 3D ultrasound image generator configured to generate 2D compound image by compounding noise-removed 3D volume data and to generate another 3D ultrasound image based on the 2D compound image with respect to the each of the 2D ultrasound images of the 3D ultrasound image.

13. The image processing apparatus of claim 12, wherein 2D ultrasound images are cross-sectional images orthogonal to a depth direction of the 3D ultrasound image.

14. The image processing apparatus of claim 12, wherein the 2D ultrasound images comprise a number of cross-sectional images most adjacent to the first 2D ultrasound image.

15. The image processing apparatus of claim 12, wherein 2D ultrasound images comprise images immediately before and after the first 2D ultrasound image.

16. The image processing apparatus of claim 12, wherein the similar ultrasound image generator is further configured to:
determine similarities between blocks of the first 2D ultrasound image and blocks of the 2D ultrasound images;
determine a number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images; and
generate the number of the similar ultrasound images based on the number of the blocks.

17. The image processing apparatus of claim 12, wherein the similar ultrasound image generator is further configured to:
determine similarities between blocks of the first 2D ultrasound image and blocks of the 2D ultrasound images based on differences between pixel values of the blocks of the first 2D ultrasound image and corresponding pixel values of the blocks of the 2D ultrasound images;
determine a number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images; and generate the number of similar ultrasound images based on the number of the blocks.

18. The image processing apparatus of claim 12, wherein the similar ultrasound image generator is further configured to:

determine similarities between blocks of the first 2D ultrasound image and blocks of the 2D ultrasound images;

generate motion vectors indicating directions and magnitudes from each of the blocks of the first 2D ultrasound image to a number of blocks, among the blocks of each of the 2D ultrasound images, in an order of high similarity to each of the blocks of the first 2D ultrasound image based on the similarities between the blocks of the first 2D ultrasound image and the blocks of the 2D ultrasound images; and generate the number of similar ultrasound images based on the number of the blocks.

19. The image processing apparatus of claim 12, wherein the 3D ultrasound image generator is further configured to:

weight pieces of 2D data of the 3D volume data; and generate the other 3D ultrasound image based on the weighted pieces of the 2D data.

20. The image processing apparatus of claim 12, wherein the 3D ultrasound image generator is further configured to:

weight blocks of pieces of 2D data based on a similarity to corresponding blocks of the first 2D ultrasound image; and generate the other 3D ultrasound image based on the weighted blocks of the pieces of the 2D data.

* * * * *